Aug. 30, 1927.
C. A. GODSHALK
1,640,700
VEHICLE SIGNALING DEVICE
Filed Dec. 3, 1923   2 Sheets-Sheet 1
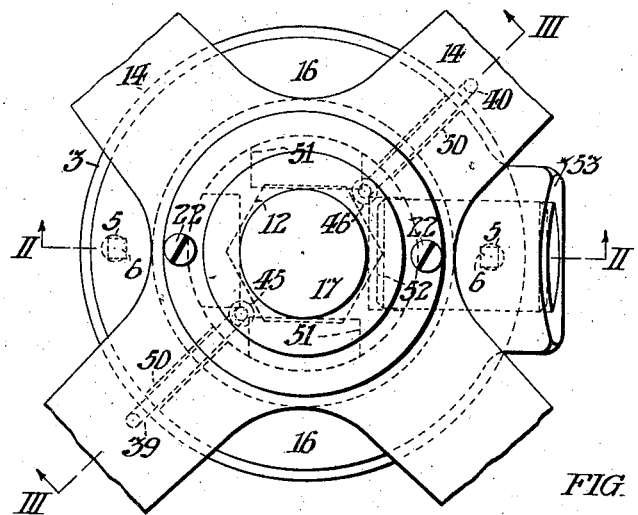
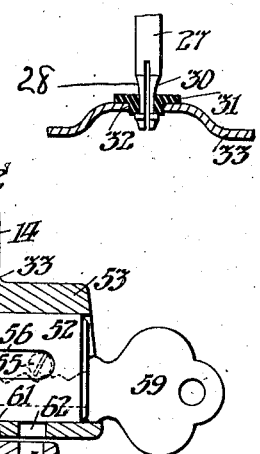
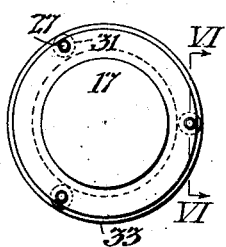
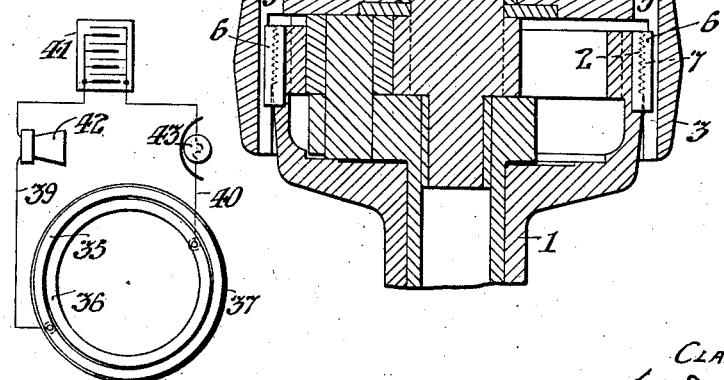
Inventor:
CLARENCE A. GODSHALK, Aug. 30, 1927.
C. A. GODSHALK
1,640,700
VEHICLE SIGNALING DEVICE
Filed Dec. 3, 1923
2 Sheets-Sheet 2
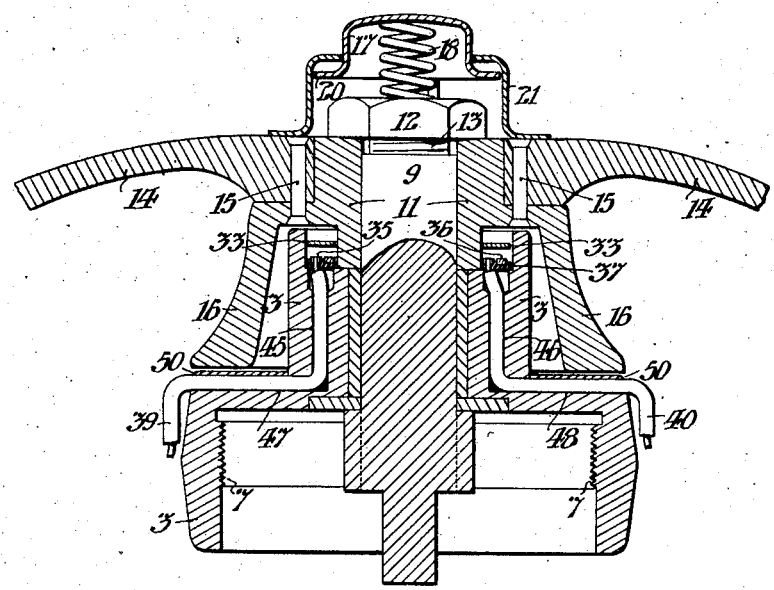
FIG. III.
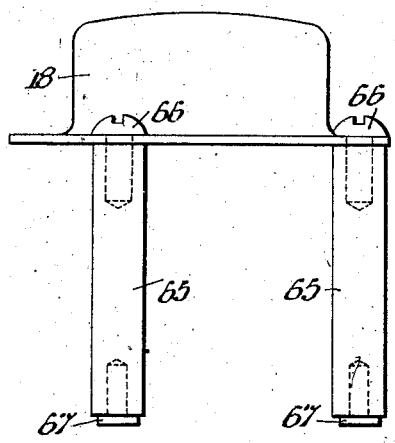
FIG. VII.
Inventor:
CLARENCE A. GODSHALK Patented Aug. 30, 1927.

1,640,700

UNITED STATES PATENT OFFICE.

CLARENCE A. GODSHALK, OF ARDMORE, PENNSYLVANIA, ASSIGNOR TO A. H. FOX GUN COMPANY, OF PHILADELPHIA, PENNSYLVANIA, A CORPORATION OF PENNSYLVANIA.

VEHICLE SIGNALING DEVICE.

Application filed December 3, 1923. Serial No. 678,132.

My improvements relate to electric systems arranged to be portable with an automobile or other vehicle, whereby either an audible or visible signal, or both, carried by the vehicle, may be manifested at the will of the operator.

As hereinafter described; my invention comprises an electric circuit including a source of current, a signaling device and a switch, the manually operative member of the latter being carried in coaxial relation with the steering wheel of the vehicle. In systems of the prior art thus broadly described; the switch mechanism carried by the wheel is electrically connected with the other parts of the system by flexible wires secured at one end upon the steering wheel and at the other end upon some stationary part of the vehicle. Such a construction and arrangement necessitate the provision of a considerable extent of such flexible wires so disposed that they may be coiled and uncoiled, or otherwise flexed, with every movement of the steering wheel throughout the complete rotation of the latter in either direction with reference to the stationary steering column. Such wires are not only unsightly and inconvenient in that they extend in such position that they must be continually avoided by the operator, but the repeated flexure to which they are subjected tends to loosen their terminal connections and thus render the circuit inoperative, whereas, it is, of course, highly desirable to maintain it continuously operative.

Therefore, the purpose and effect of my present invention are to provide a construction and arrangement avoiding the necessity for employment of any such flexible conductors between the rotary steering wheel and the stationary steering column and to provide means to otherwise effect the desired electrical connections; which means are covered and concealed, out of the way of the operator, and conveniently within the hub of the vehicle steering wheel and the subjacent head or cap of the stationary steering column. My copending application (138-23) Serial No. 674,837, filed November 15, 1923, for Letters Patent of the United States, includes claims broadly covering such means, but the claims in this case describe a form of my invention which is different from the specific form claimed in that case. In that case, the electric circuit in the vehicle comprises two terminals secured upon the steering column, so that they do not turn with the steering wheel, but are relatively movable into contact with each other, like the terminals of an ordinary push button, but such movement is mechanically effected by manually operative switch mechanism carried by the steering wheel and including a push ring which overlies said terminals and is moved to cause the latter to contact with each other, but without including such push ring in the electric circuit. On the contrary, in the form of my invention herein shown; the electric circuit in the vehicle comprises two terminals secured upon the steering column in such relation that they cannot contact with each other, but consist of two plane rings which are held in immovable relation with each other and in concentric relation with the steering shaft, but the gap between them is arranged to be bridged and the circuit thus completed by a movable electric conducting contact or contacts carried by the steering wheel in connection with switch mechanism by which the same may be manually pushed into contact with both of said terminals.

My invention includes the various novel features of construction and arrangement hereinafter more definitely specified.

In said drawings; Fig. I is a fragmentary plan view of a steering wheel conveniently embodying my improved switch mechanism.

Fig. II is a fragmentary vertical sectional view of the parts shown in Fig. I and the subjacent parts of the rotary steering wheel and stationary steering column, and their appurtenances, taken on the line II, II in Fig. I.

Fig. III is a fragmentary vertical sectional view of the structure shown in Figs. I and II, but taken on the line III, III in Fig. I.

Fig. IV is a plan view of said stationary terminals of the electric circuit with a diagram of said circuit.

Fig. V is a plan view of a contact push slip ring adapted to bridge said terminals in the embodiment of my invention shown in said figures.

Fig. VI is a fragmentary vertical sectional view of said push slip ring, taken on the line VI, VI in Fig. V, but on a larger scale, showing means for connecting the same in insulated relation with the manually operative push button plunger shown in Figs. I, II and III.

Fig. VII is an enlarged side elevation of a modified form of my invention including a plurality of spring contacts, carried by a manually operative push button plunger in lieu of the slip ring shown in Fig. V.

In said figures: I have shown a form of my invention adapted for embodiment in an automobile having steering gearing of the "Ford" type, including the stationary steering column post 1 provided with the screw thread 2 adapted to be engaged by the stationary head cap 3 including an annular electric terminal recess 4 at its top. Said cap has key sockets 5, preferably in diametrically opposite positions, as indicated in Fig. II, each adapted to receive a key 6 which is driven downward therein in engagement with the screw threads 7 connecting said cap 3 with said column 1, to normally prevent said cap from being unscrewed from said column, but which may be driven upward and out when the steering wheel is removed from said column or the lock hereinafter described is withdrawn.

The steering shaft 9 is mounted to rotate in said post column 1 and is operatively connected, by the key 10, with the steering wheel hub 11, to which it is detachably rigidly secured by the nut 12, engaging the screw thread 13, on said shaft. Said steering wheel conveniently includes an annular wooden rim rigidly connected with the outer ends of the arms of the aluminum spider 14, which is rigidly connected with said hub 11, conveniently by rivets 15 indicated in Fig. III. Said hub 11 has the skirt flange 16 overhanging said cap 3 and covering said terminal recess 4.

The electric switch mechanism includes the hollow push button plunger 17 carried by said wheel spider 14 in axial relation therewith and having the helical spring 18 in it arranged to press it axially outward. However, the outward movement of said plunger 17 is limited by its circular flange 20 encountering the hollow retaining ring 21 which overhangs said plunger flange and is rigidly connected with said wheel spider 14, conveniently by the two screws 22. Said flange 20 has a circular series of three plunger rod seats 24 arranged to register with the circular series of three sockets 25, extending through said hub 11; which series are in coaxial relation with said wheel. Each of the three plunger rods 27 has an annular groove 28 near its outer end forming a reduced portion adapted to fit in one of said seats 24 in which said rods are held by their engagement in said sockets 25. Each of said rods 27 is split and thus bifurcated at its lower portion, and has near its lower end, a region 30 of reduced diameter, as indicated in Fig. VI, so that said rods may be respectively thrust through and respectively engage resilient insulating bushings 31 which may be formed of soft rubber and are thus secured in openings 32 in upwardly offset portions of the push slip ring 33 which is an electric conductor. Said ring 33 is thus rigidly connected with said push button plunger 17 for vertical reciprocation in said annular electric terminal recess 4 in the top of said cap 3 and is normally upheld by said spring 18 in the position shown in Fig. II. However, said ring 33 may be depressed into contact with the two plane metal ring terminals 35 and 36 of the electric circuit indicated in Fig. IV; which terminals are fixed in relatively immovable relation in the insulating base ring 37 in said stationary column cap recess 4. Said terminals 35 and 36 are respectively connected to the conductor wires 39 and 40 comprised in said circuit, which also includes any suitable source of electric energy, indicated as a storage battery 41 and any suitable electrically operative signal 42 indicated as a horn.

However, it is to be understood that any other electric translating device may be included in said circuit to be operated by the switch mechanism above described. For instance, said circuit may include an incandescent lamp 43 or any other audible or visible signaling device. In other words; said switch mechanism may be used to either operate an audible signal, or a visible signal, or both, or any other electrically operative element, for instance, an incandescent lamp disposed with a suitable reflector as a search light. Of course, when said plunger 17 is manually depressed, in opposition to said spring 18, said push slip ring 33 bridges and closes the circuit between said stationary contacts 35 and 36 and thus operates whatever signal devices are included in said circuit.

Although I have indicated wire conductors upon both sides of said circuit leading from said switch; of course, one side of the circuit may be established through the metallic frame of the vehicle, in which case, only one stationary terminal is necessary for cooperation with the slip ring 33 which, in that case, would not be insulated but in electric connection with said metallic frame. Such a contact is shown in Fig. VII. As shown in Fig. III; said conductor wires 39 and 40 extend downward through drilled holes 45 and 46 and radially outward therefrom in channels 47 and 48 in said cap 3, which channels are covered by sheet metal slides 50. However, they may be otherwise disposed.

As shown; said stationary steering column cap 3 is provided with a circular series of four locking recesses 51 adapted to be selectively engaged by the lock body 52 which is mounted to reciprocate in the lock casing 53 which is formed in unitary relation with the hub 11; so that said wheel may be thus locked in operative position, when desired, without interfering with the continued operativeness of the signaling device. However, said lock not only then prevents access to the switch mechanism seated in said cap recess 4, but prevents removal of said cap 3 from the steering column 1 and thus prevents tampering with said switch mechanism during the absence of the operator.

Said locking mechanism is of the general character claimed in Letters Patent of the United States No. 1,367,200 granted to James A. Murphey February 1, 1921. The reciprocatory movement of said lock body 52 to and from engagement with said locking recesses 51 is limited by the set screw 55 which is mounted in said lock casing 53, so as to extend in the slot 56 in said lock body. The latter includes the transversely reciprocatory plunger 58 which normally projects downward, but may be raised by rotation of the key 59 which then serves as a handle by which said lock body may be reciprocated. Said plunger 58 is adapted to alternately extend into the two recesses 61 and 62 in said lock casing 53 to detain said lock body alternately in the locked position shown in Fig. II, and in withdrawn unlocked position. It may be observed that in either of said positions, said lock body 52 prevents access to said recess 62. When said lock body 52 is unlocked and withdrawn from said casing by said key 59, said recess 62 may be brought into registry with either of said key sockets 5, so that the keys 6 may be driven upward and outward to release said column cap 3, so that the latter may be unscrewed from said column 1 for repairs etc. However, it may be obseved that when said lock body 52 is in its normal unlocked position, the steering wheel may be released and removed from said shaft 9 by unscrewing said nut 12; thus affording access to said slip ring 33 carried by said wheel, and the stationary contacts 35 and 36 with which it cooperates in said column cap 3, and permitting said keys 6 to be driven out.

However, as above noted with reference to Fig. VII, the electric circuit may be completed by a push button switch device without the employment of a continuously annular slip ring such as indicated at 33. In said figure; the push button plunger 18 is provided with three plunger rods 65 held therein by respective screws 66 and provided at their lower ends with contact elements 67, of which there are three in equal circumferentially spaced relation, each adapted to bridge the gap between said stationary terminals 35 and 36.

Although I have found it convenient to illustrate my invention in connection with steering mechanism of the peculiar "Ford" type; it is to be understood that it is not limited to such an embodiment. Therefore, I do not desire to limit myself to the precise details of construction and arrangement herein set forth, as it is obvious that various modifications may be made therein, without departing from the essential features of my invention, as defined in the appended claims.

I claim:

1. An electric device including the combination with a pair of relatively immovable annular terminals; of means arranged to electrically connect said terminals, including an annular push ring overlying said terminals; a member having a circular series of sockets in registry with said push ring; a manually operative plunger overlying said socketed member; a circular series of plunger rods extending from said plunger in said sockets, in cooperative relation with said push ring; and a spring arranged to normally hold said plunger rods and ring in inoperative position.

2. An electric device including the combination with a pair of relatively immovable annular terminals; of means arranged to electrically connect said terminals, including an annular push ring overlying said terminals; a member having a circular series of sockets in registry with said push ring; a manually operative plunger overlying said socketed member; a circular series of plunger rods extending from said plunger in said sockets, in cooperative relation with said push ring; each of said rods having a circumferential groove forming a reduced portion near the inner end thereof and being split longitudinally at its inner end; resilient insulating bushings respectively encircling said rods in said reduced portions thereof and mounted in said push ring; and a spring arranged to normally hold said plunger rods and ring in inoperative position.

3. An electric device including the combination with a pair of relatively immovable annular terminals; of means arranged to electrically connect said terminals, including an annular push ring overlying said terminals; a member having a circular series of sockets in registry with said push ring; a manually operative plunger overlying said socketed member; a circular series of plunger rods extending from said plunger in said sockets, in cooperative relation with said push ring; each of said rods having a circumferential groove forming a reduced portion near the inner end thereof and being split longitudinally at its inner end; resilient insulating bushings respectively encircling said rods in said reduced portions thereof and mounted in said push ring; said ring having portions upwardly offset from its normal plane, and said bushings being mounted in said offset portions; and a spring arranged to normally hold said plunger rods and ring in inoperative position.

4. An electric device including the combination with a pair of relatively immovable annular terminals; of means arranged to electrically connect said terminals, including an annular push ring overlying said terminals; a member having a circular series of sockets in registry with said push ring; a manually operative plunger overlying said socketed member, and having a circular series of plunger rod seats respectively in registry with said sockets; a circular series of plunger rods extending from said plunger in said sockets in cooperative relation with said push ring; each of said rods having a circumferential groove near its upper end forming a reduced portion adapted to fit in one of said seats, in which said rods are held by their engagement in said sockets; and a spring arranged to normally hold said plunger rods and ring in inoperative position.

5. An electrical device including the combination with a pair of relatively immovable annular terminals, means arranged to electrically connect said terminals, including an annular push ring overlying said terminals and having a circular series of insulating bushing openings therein, the portions of said ring provided with said openings being offset from the normal plane of said ring away from said terminals, a member having a circular series of sockets in registry with said openings in said push ring, a manually operable plunger overlying said socketed member, a circular series of plunger rods connected to said plunger and extending through said sockets and operatively connected to said push ring, insulating bushings encircling said rods and securely mounted in said openings in said push ring and a spring arranged to normally hold said plunger and the rods and ring connected thereto out of contact with said terminals.

6. An electrical device including the combination with a metallic cap for the steering column of an automobile, having an annular terminal recess in the top of said cap concentric with said column, terminals in said recess and two conductor passageways leading away from said terminal recesses parallel to the axis of said column and then extending radialy outward respectively to diametrically opposite portions of the exterior of said cap, of an annular push ring overlying said terminals, a member having circular series of plunger rods extending therethrough and connected to said push ring, a manually operative plunger connected to the upper ends of said plunger rods and a spring for normally holding said plunger rods and ring out of contact with said terminals, the lower ends of said rods being insulated from said push ring.

In testimony whereof, I have hereunto signed my name at Philadelphia, Pennsylvania, this 13th day of November, 1923.

CLARENCE A. GODSHALK.